A. CROMBIE.

MINING-MACHINE.

No. 7,079. Reissued April 25, 1876.

Witnesses:
James Martin Jr.
J. P. Theodore Lang.

Inventor:
Alexander Crombie
by
Mann, Renick & Parmenter.

N. PETERS, PHOTO-LITHOGRAPHER, WASHINGTON, D. C.

UNITED STATES PATENT OFFICE.

ALEXANDER CROMBIE, OF WILMINGTON, ILLINOIS.

IMPROVEMENT IN MINING-MACHINES.

Specification forming part of Letters Patent No. 171,470, dated December 28, 1875; reissue No. 7,079, dated April 25, 1876; application filed April 8, 1876.

*To all whom it may concern:*

Be it known that I, ALEXANDER CROMBIE, of Wilmington, in the county of Will and State of Illinois, have invented a new and useful Improvement in Mining-Machines; and I do hereby declare that the following is a full, clear, and exact description thereof, reference being had to the accompanying drawings, forming part of this specification, in which—

Figure 1:
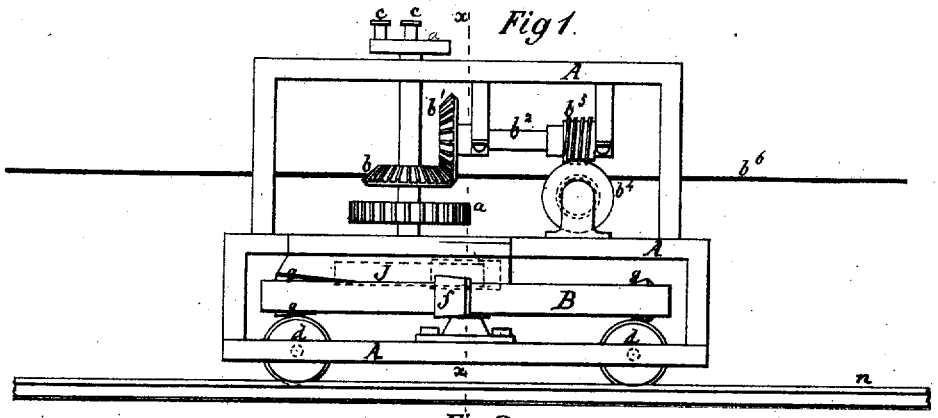
Figure 2:
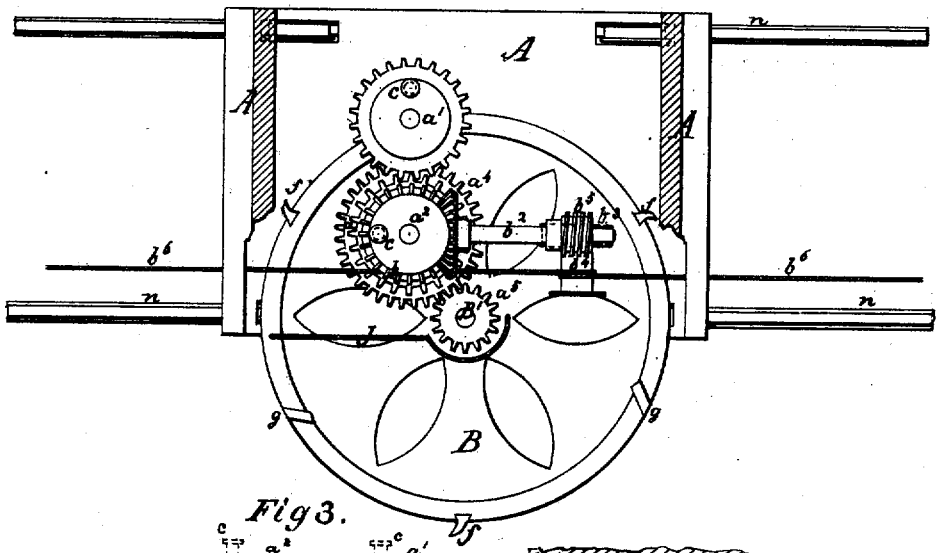
Figure 3:
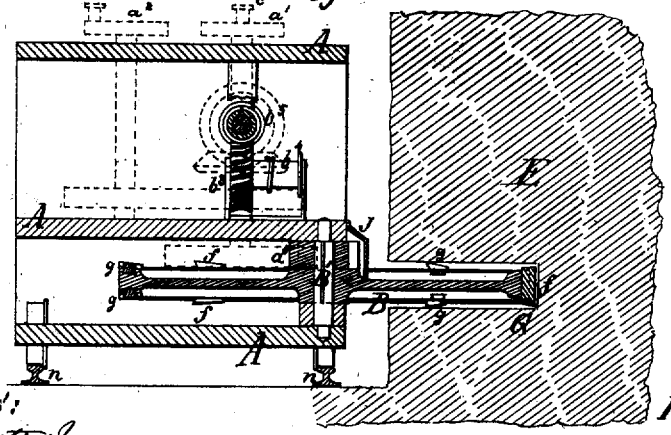

Figure 1 is a side elevation of the machine; Fig. 2, a plan view, a portion of the frame being broken out to expose parts below. Fig 3 is a vertical transverse section in the line *x x* of Fig. 1.

My invention relates to an improvement in that class of coal-mining machines which have horizontally-revolving cutters or picks carried by longitudinally-moving carriages, and which cut horizontal channels in mines of coal, and thereby facilitate the operation of mining or digging out the coal above the channels with picks and other hand implements.

The nature of my invention consists in a rotary coal-channeling wheel, made fast on a revolving shaft, which is sustained at its upper end by and within the main frame proper, and is driven or operated by means of gearing set in motion by cranks of engines mounted with the gearing upon and within the said main frame proper. By my invention a very compact and strong machine is produced, and about one-half of the diameter of the channeling-wheel is overhung and protected by the main frame and the gearing of the machine, and all tendency of the wheel under great resistance to be deflected from a position perpendicular to the face of the main frame is avoided, as its shaft is held steady and firm, and is driven by gearing, the shafts of which are also supported firmly at their upper ends by the main frame proper.

To enable others skilled in the art to understand my invention, I will proceed to describe it.

In the accompanying drawings, A represents a main frame proper of the machine. This frame is of metal, and strong and substantial, and it affords firm bearings and supports for the necessary shafts of the machine. Near the base of this frame the planer or cutting-wheel B is arranged in a horizontal position on a vertical shaft, B′, which is sustained by and within the frame against vertical movement and lateral deflection. About one-half of the planer or wheel extends into the frame, and above this inclosed portion of the wheel or planer the necessary shafts and wheels are placed, the frame affording firm support for the same. For giving a very rapid rotary motion to the planer two spur-wheels, *a*, are placed on the shafts $a^1$ $a^2$, so as to gear with one another, and on the shaft $a^2$ a larger spur-wheel, $a^4$, which gears with a pinion, $a^5$, on the planer-shaft, is provided.

For operating the feed-motion of the machine a bevel-wheel, *b*, is fitted on the shaft $a^2$, and this gears with a bevel-wheel, $b^1$, on the worm-shaft $b^2$, and causes the worm $b^5$ of said shaft to revolve and turn the screw-wheel $b^3$. On the shaft of the screw-wheel a tight-rope drum, $b^4$, is placed, and around this drum is coiled a rope, $b^6$, which is fastened to fixed objects at its extremities. This system of gearing, which may be modified in its character, as circumstances may require, receive its motion from either compressed air or steam-engines connected to the cranks *c c*, two engines being used, so as to avoid the getting on dead-center and to secure a more regular motion. The frame A, with its connections, rests upon flanged wheels *d*, which are connected to the frame in any proper manner, and roll upon a suitable railway, *n*, laid in proper relation to the side wall of a coal-mine. The cutting-wheel or planer B is made of metal, and is provided with removable knives *f* on its periphery, and there may be other movable knives or planers *g* provided on the two sides of the wheel near its periphery to increase the efficiency of the machine, especially for enabling the machine to cut its way out with ease. The knives *f* and *g* should have but a very slight projection from the surfaces of the wheel, as their work is to be done by planing rather than by picking deep into the coal. These knives may be fastened to the cutting-wheel in dovetails or in any other desirable manner; and in order to have a broad seat for the outer knives, and have the cutting-wheel act as a balance-wheel, and to prevent binding between its whole face and the walls of the coal being mined the web of the wheel is made thin, while its rim is made thick and heavy. J is a guard for preventing pieces of coal and dirt from passing into the main frame along with the knives or cutters during the operation of the machine. The machine is intended to run on the rails *n* along the side of the wall of a coal-mine, E, and as it moves along by means of the screw-power $b^3$ and $b^5$ and the tight rope $b^6$ the planer or cutting-wheel B cuts the channel G in the wall of the mine E, and this done it is a comparatively easy matter to break or pull down the coal above the channel G, as it has nothing below it to support its weight.

The form and construction of the machine may be varied so as to conform to any circumstances and character of mining, so long as the leading characteristics of my invention are not departed from, and it is plain that with a machine of this character a very great amount of work may be done in a short time with slight expense.

I do not claim a saw arranged between two bars and driven by an internal pressure of air or water upon a flanged hub. Neither do I claim a revolving cutter, having its axis supported in a bracket bolted to the outside of the main frame, and such cutter having the power applied near to its periphery instead of to its axial shaft; but Having described my invention, what I claim, and desire to secure by Letters Patent, is—

The mining-machine described, in which a cutting-wheel provided with planing-cutters or knives on its outer rim revolves on a shaft supported by and and within the body of a main frame, and receives its motion from engines by means of gears and shafts, which are supported by and arranged within said frame, substantially as and for the purpose described.

ALEXANDER CROMBIE.

Witnesses:
ASA F. MATHER,
WILLIAM CAMPBELL.